(12) United States Patent
Oguchi et al.

(10) Patent No.: US 7,306,150 B2
(45) Date of Patent: Dec. 11, 2007

(54) CARD READER

(75) Inventors: Shigeki Oguchi, Nagano (JP); Kazunori Takahashi, Nagano (JP)

(73) Assignee: Sankyo Seiki Mfg. Co., Ltd. (JP)

( * ) Notice: Subject to any disclaimer, the term of this patent is extended or adjusted under 35 U.S.C. 154(b) by 339 days.

(21) Appl. No.: 11/032,589

(22) Filed: Jan. 10, 2005

(65) Prior Publication Data

US 2005/0156042 A1 Jul. 21, 2005

(30) Foreign Application Priority Data

Jan. 16, 2004 (JP) ............... 2004-008955
Oct. 8, 2004 (JP) ............... 2004-296242

(51) Int. Cl.
*G06K 7/06* (2006.01)

(52) U.S. Cl. ............... 235/441; 235/444; 235/453; 235/492

(58) Field of Classification Search ............... 235/441, 235/492, 453, 444, 479
See application file for complete search history.

(56) References Cited

U.S. PATENT DOCUMENTS 4,782,217 A * 11/1988 Soza et al. ............... 235/380
5,362,951 A * 11/1994 Kanazawa et al. ............... 235/449
5,434,404 A * 7/1995 Liu et al. ............... 235/475
5,438,186 A * 8/1995 Nair et al. ............... 235/449
5,652,422 A * 7/1997 Shimaoka et al. ............... 235/475
6,216,954 B1 * 4/2001 Kuwamoto et al. ............... 235/486
6,394,344 B1 * 5/2002 Katsumura et al. ............... 235/380
6,659,348 B2 * 12/2003 Nagata et al. ............... 235/451
6,742,706 B2 * 6/2004 Sakamoto et al. ............... 235/439

FOREIGN PATENT DOCUMENTS

JP 2003-168516 6/2003

OTHER PUBLICATIONS

English Abstract of JP2003-168516 (Jun. 13, 2003).

* cited by examiner

*Primary Examiner*—Ahshik Kim
(74) *Attorney, Agent, or Firm*—Cantor Colburn LLP

(57) ABSTRACT

A card reader may comprise a power supply part for the card reader, a peripheral device including at least an inlet part for connecting a power cable to the power supply part from outside, a card reader part, a lower case for housing the power supply part and the peripheral device which is disposed in a linear manner, an upper case for housing the card reader part, and a recessed part for allowing the power cable to be inserted into the inlet part for connection. The inlet part and the recessed part for allowing the power cable to insert into the inlet part may be arranged in a linear manner and parallel to the power supply part.

21 Claims, 9 Drawing Sheets

CARD READER

The present invention claims priority under 35 U.S.C. §119 to Japanese application 2004-008955 filed Jan. 16, 2004 and Japanese application 2004-296242 filed Oct. 8, 2004, the entire disclosures of which are incorporated herein by reference.

BACKGROUND OF THE INVENTION

Most electric apparatuses such as a card reader use a connecting cord such as a power cable or an interfacing cable for connecting with outside power sources or external components. These connecting cords may worsen the outer appearance of the electric apparatus when they are disposed on the front side of the main body of the apparatus or may become an obstacle for installation when they are disposed on the side part or the upper part. Therefore, most connecting cords are disposed to protrude toward the rear direction from the back of the main body of the apparatus like a tail of a mouse (see Japanese Patent Laid-Open No. 2003-168516).

Alternatively, some electric apparatuses including card readers may use a connector (plug part) of a power cable that is connected to the inlet part of the electric apparatus. In these electric apparatuses, a connector support means is sometimes used for locking the connected connector so as not to accidentally disengage the connector from the inlet part (see Japanese Patent Laid-Open No. 2003-168516).

The above-mentioned locking structure is constructed such that a main-body connector, to which a cable connector is connected, is provided on the outer wall face part of the main body case. Additionally, a locking member made of a sheet metal having a mounting part and an engagement part is fixed on the main body case with a screw located through a slot of the mounting part for locking the cable connector.

However, when the connecting cord protrudes straight toward the rear direction from the back of the main body of the apparatus, the mounting direction of the electric apparatus is limited or its installing location is restricted because a rear space is required in the electric apparatus. Also, when the connecting cord is a power cable, a user may sometimes designate the length, color, etc. and the conformable specification of the power cable without allowing the use of a common drawing/inserting type of power cable. In this case, since the power cable will not be easily changed, the management cost may increase.

Further, the main-body connector is provided on the outer wall face part of the main body case and a cable connector is connected to the main-body connector. Therefore, the cable connector protrudes outward from the main body case. In this case, the cable connector is engaged with an engaging member (locking member) and thus the engaging member is formed to extend outward from the main body case and a considerable space is required. Also, when the main body of the apparatus is installed in front of a wall, the power cable extending from the back of the apparatus abuts with the wall and bent, and thus heat may be generated or disconnection may occur.

Further, since the mounting part of the engaging member is fixed on the main body case with a screw, fixing work using a tool is required and the detaching of the screw and the loss of the fixing member may occur. Also, when an external force, for example, a force in the downward direction is applied to the engaging member, the engaging member may be easily deformed.

SUMMARY OF THE INVENTION

In view of the problems described above, the present invention may advantageously provide a card reader in which a power cable does not obstruct the installation of the main body of the card reader. Further, the present invention may advantageously provide a card reader in which a plug part that is connected to an inlet part is capable of being not accidentally disengaged without protruding the plug part of the power cable from the main body of the card reader. Further, the present invention may advantageously provide a card reader which includes an engaging member capable of being disposed in a small space and capable of being mounted without using a tool.

Thus, according to the present invention, there may be provided a card reader including a power supply part for the card reader, a peripheral device including at least an inlet part for connecting a power cable to the power supply part from the outside, a card reader part, a lower case for housing the power supply part and the peripheral device, an upper case for housing the card reader part, and a recessed part or cavity for allowing the power cable to be inserted into the inlet part for connection.

Therefore, since the hard portion (plug part) of the power cable near the inlet part is accommodated in the recessed part, the portion of the power cable drawn out from the recessed part is flexible and thus the drawing direction of the power cable from the apparatus can be freely changed, for example, in the rear direction or in the side direction. Also, since the inlet part is provided, various power cables with different specifications can be used. Further, since the peripheral device or devices for the power supply part may be disposed in a linear manner, and parallel to the power supply, the length of the internal wiring cable on the primary power supply side, which easily generates noise, can be shortened and the occurrence of noise can be suppressed. For example, the inlet part and the recessed part for inserting the power cable which is to be connected to the inlet part may be constructed so as to be arranged in a linear manner and parallel to the power supply part.

In accordance with an embodiment of the present invention, the card reader may include a base plate that separates the power supply part and the peripheral device from the card reader part, and that mechanically supports and electrically connects the power supply part, the peripheral device (s), and the card reader part. Therefore, since the electrical connections are performed through the base plate, the electric wiring can be reduced. Also, the power supply part and the peripheral devices are shielded by the base plate, and thus the transmission of noise from the power supply part and the peripheral devices to the card reader part is prevented and the occurrence of noise in the card reader can be suppressed.

In accordance with an embodiment of the present invention, the card reader may include a shorting bar, which is provided in the peripheral device, an operating hole of the lower case for allowing an operation from the outside, and a leg member which closes the operating hole. Therefore, the shorting bar can be operated without detaching the lower case or the upper case.

In accordance with an embodiment of the present invention, the card reader may include an engaging member which is disposed on the recessed part and provided with an engaging part for engaging with the plug part of the power cable that is to be connected to the inlet part. Therefore, when the plug part of the power cable is inserted into the inlet part provided on the recessed part, the plug part is engaged and locked by the engaging part of the engaging member. Thereby, even when the power cable is pulled in the drawing-out direction, the plug part does not disengage from the inlet part. The plug part of the power cable may be integrally formed as a part of the power cable or may be connected by using a discrete plug component.

In accordance with an embodiment of the present invention, the engaging member may be turnably mounted on the recessed part and the engaging part may be a free end of the engaging member. Therefore, since the engaging part is capable of locking the plug part by turning the engaging member, the engaging member can be arranged in a small space and operated by hand.

In accordance with an embodiment of the present invention, the position where the engaging part engages with the plug part is set to be on the power cable side with respect to the turning center of the engaging member. Therefore, even when a force in the drawing-out direction is applied to the engaging part, the engaging part is subjected to turn on the power cable side and thus the engaging part locking the plug part does not disengage.

In accordance with an embodiment of the present invention, the card reader includes a stopper for regulating the turning range of the engaging member. Therefore, the stopper regulates the engaging member turning in a prescribed range, and thus the direction of drawing-out of the plug part can be regulated. The stopper is preferably provided at the position close to the center line of the power cable.

According to the card reader constructed described above in accordance with an embodiment of the present invention, the hard portion (plug part) of the power cable near the inlet part is accommodated in the recessed part. Therefore, the portion of the power cable drawn out from the recessed part is flexible and thus the drawing direction of the power cable from the apparatus can be freely changed, for example, in the rear direction or in the side direction. Accordingly, the degree of freedom for installing place of the card reader can be enhanced. In addition, since the inlet part is housed in the main body, the plug part of the power cable does not protrude from the main body and the entire card reader can be constructed in a compact form.

Moreover, since the inlet part is used, various power cables with different specifications can be utilized, and thus the versatility of the card reader can be enhanced. Further, since the peripheral device or devices for the power supply part for the card reader is may be disposed in a linear manner and may be located parallel to the power supply, the length of the internal wiring cable on the primary power supply side, which easily generates noise, can be shortened. As a result, since the occurrence of noise can be suppressed, the reliability of operation of the card reader part can be enhanced.

According to an embodiment of the present invention, since the electrical connection is performed through the base plate, electric wiring can be reduced and the occurrence of noise can be suppressed.

According to an embodiment of the present invention, since the shorting bar can be operated without detaching the lower case or the upper case, the inspection for the card reader can be easily performed.

According to an embodiment of the present invention, when the plug part of the power cable is inserted into the inlet part provided on the recessed part, the plug part can be engaged and locked by the engaging part of the engaging member. Therefore, even when the power cable is pulled in the drawing-out direction, the plug part does not disengage from the inlet part. Also, since the plug part of the power cable does not protrude outward from the card reader, the disconnection of the power cable is prevented.

According to an embodiment of the present invention, since the engaging part is capable of locking the plug part by turning the engaging member, the engaging member can be arranged in a small space and operated by hand.

According to an embodiment of the present invention, even when a force in the drawing-out direction is applied to the engaging part, the engaging part is subjected to turn on the power cable side and thus the engaging part locking the plug part does not disengage.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
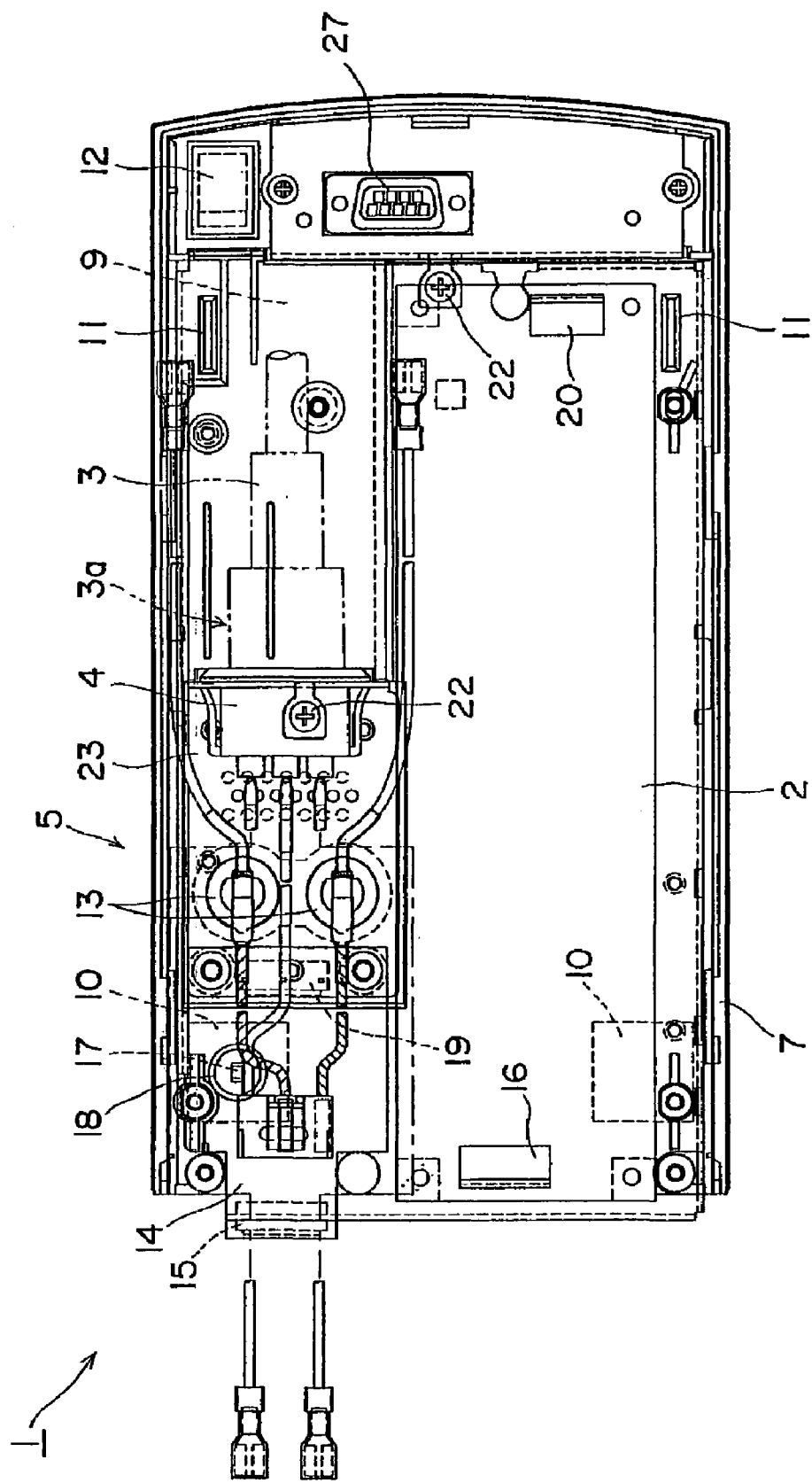
FIG. 1 is a plan view showing a lower case when an upper case and a base plate are removed from a card reader in accordance with an embodiment of the present invention.

The construction in accordance with embodiments of the present invention will be described in detail below with reference to the accompanying drawings.

FIRST EMBODIMENT

FIGS. 1 through 5 show an example of a card reader in accordance with a first embodiment of the present invention. The card reader 1 includes a power supply part 2 for the card reader, peripheral devices 5 such as an inlet part 4 for connecting a power cable 3 to the power supply part 2 from the outside, and a card reader part 6. The card reader 1 is also provided with a lower case 7 for accommodating the power supply part 2 and the peripheral devices 5 disposed in a linear manner, an upper case 8 for accommodating the card reader part 6, and a recessed part 9 or cavity for accommodating the power cable 3 which is connected to the inlet part 4.

The recessed part 9 is formed on the under surface 7a of the lower case 7. Therefore, since a hard portion (plug part) 3a of the power cable 3 near the inlet part 4 is accommodated within the recessed part 9, the flexible portion 3b of the power cable 3 is drawn out from the recessed part 9 and thus the drawing direction of the power cable 3 from the device can be changed freely, for example, in the rear direction or in the side direction.

The inlet part 4 is constructed so as to cope with different types of power cables 3 for the specification in the United States, Europe or other countries. Therefore, versatility of the card reader is enhanced because available area is expanded. The inlet part 4 is disposed so as to be embedded in the bottom part of the lower case 7. Also, the inlet part 4 is disposed so as to face backward at an approximately central part in the length direction of the apparatus. Therefore, the power cable 3 can be disposed in a longitudinal manner.

The respective cases 7, 8 are made of plastic. Leg members 10, 11 are mounted on the under surface 7a of the lower case 7. The leg member may be formed of a rubber leg 10 or a protruded part 11 of the lower case 7. The height (length) of the leg members 10, 11 from the under surface 7a of the lower case 7 is set to be larger than the diameter of the power cable 3. Therefore, the power cable 3 can be turned in a desired direction without being sandwiched and fixed by the under surface 7a of the lower case 7 and the floor.

The peripheral devices 5 which are accommodated in the lower case 7 are a power switch 12, a fuse 13, a lightning surge circuit board 14 or other electronic devices in addition to the inlet part 4. As shown in FIG. 1, the inlet part 4 is disposed so as to face backward, the power switch 12 is disposed on the rear side of the apparatus and the fuse 13 and the lightning surge circuit board 14 are disposed on the front side of the apparatus. These peripheral devices 5 may be connected as shown in FIG. 1, i.e., the inlet part 4, the power switch 12, the fuse 13, and the lightning surge circuit board 14, but concrete electric wirings are omitted in the drawing. Further, the output connector 15 of the lightning surge circuit board 14 is connected to the input connector 16 of the power supply part 2. The output connector 15 and the input connector 16 are disposed in a close relation. As a result, the occurrence of noise can be suppressed in the connecting cord between the output connector 15 and the input connector 16. The notational symbol 19 in the drawings is the input connector of the lightning surge circuit board 14.

A shorting bar 17 may also provided on a part of the peripheral devices 5, for example, on the lightning surge circuit board 14. The shorting bar 17 is normally arranged so as to be in contact with the lightning surge circuit board 14 to make its internal circuit patterns electrically short-circuited. The electrically shorted state is canceled by separating or detaching the shorting bar 17 from the internal circuit of the lightning surge circuit board 14 to perform the insulation testing and the withstand voltage test. The lower case 7 is provided with an operating hole 18 for operating the shorting bar 17 from the outside of the lower case 7 and the leg member 10 for closing the operating hole 18. In other words, the position of the leg member 10 is set to be the same place as that of the operating hole 18, and thus the leg member 10 can close the operating hole 18. Therefore, the shorting bar 17 can be operated without detaching the lower case 7 and the upper cases 8 and thus satisfactory inspection and productivity can be obtained. In the embodiment described above, a detachable rubber leg member is used as the leg member 10 for closing the operating hole 18. In the embodiment described above, the shorting bar 17 is provided so as to make the circuit of the lightning surge circuit board be short-circuited. However, the position of the shorting bar 17 may be arranged at any place that is from the inlet part 4 to the lightning surge circuit board 14.

The power supply part 2 for the card reader performs the AC/DC conversion of an external AC power source to obtain rectification without noise. The output part 20 of the power supply part 2 is connected to the card reader part 6.

The power supply part 2 and the peripheral devices 5 are separated from the card reader part 6 by the base plate 21 which is mechanically supported by screws 22 or the like. Also, the base plate 21 electrically connects the power supply part 2 and the peripheral devices 5 with the card reader part 6. Thus, a frame ground (FG) connection of the power supply part 2, the peripheral devices 5 and the card reader part 6 is performed by the base plate 21. Thus, electric wirings can be reduced and the card reader part 6 can be shielded so that the noise from the power supply part 2 and the peripheral devices 5 is not transmitted to the card reader part 6 and thus the occurrence of noise of the card reader 1 can be suppressed.

The inlet part 4 and the fuse 13 are supported on an inlet bracket 23. The lightning surge circuit board 14 is connected to the inlet bracket 23 so as to perform the frame ground (FG) connection. In other words, the inlet bracket 23 provides a fixing function and an earth or ground connecting function of the circuit board. The power supply part 2 is connected to the lightning surge circuit board 14 by using a connector wiring so as to perform the frame ground (FG) connection. The inlet bracket 23 is fixed to the base plate 21 with a screw.

An interface part 24 is provided at the rear part of the apparatus. An interface circuit board 25 is connected to the interface bracket 26 so as to perform the frame ground (FG) connection. The interface bracket 26 provides a fixing function and an earth or ground connecting function of the circuit board. The interface bracket 26 is fixed to the base plate 21 with a screw. The interface connector 27 is disposed at the rear part of the apparatus so as to face downward.

Figure 2:
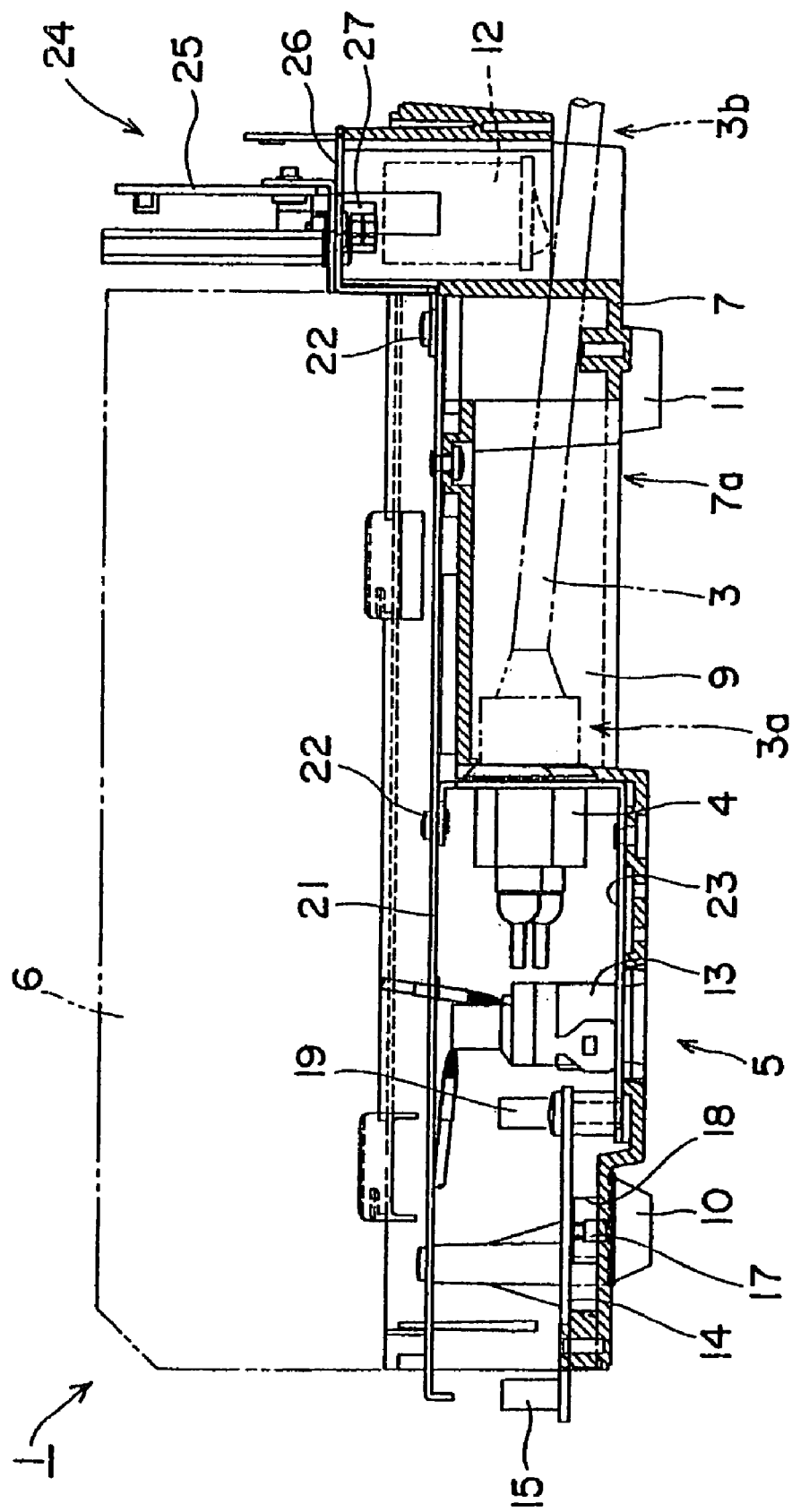
FIG. 2 is a longitudinal cross sectional side view showing the lower case when the upper case of the card reader is removed.
Figure 3:
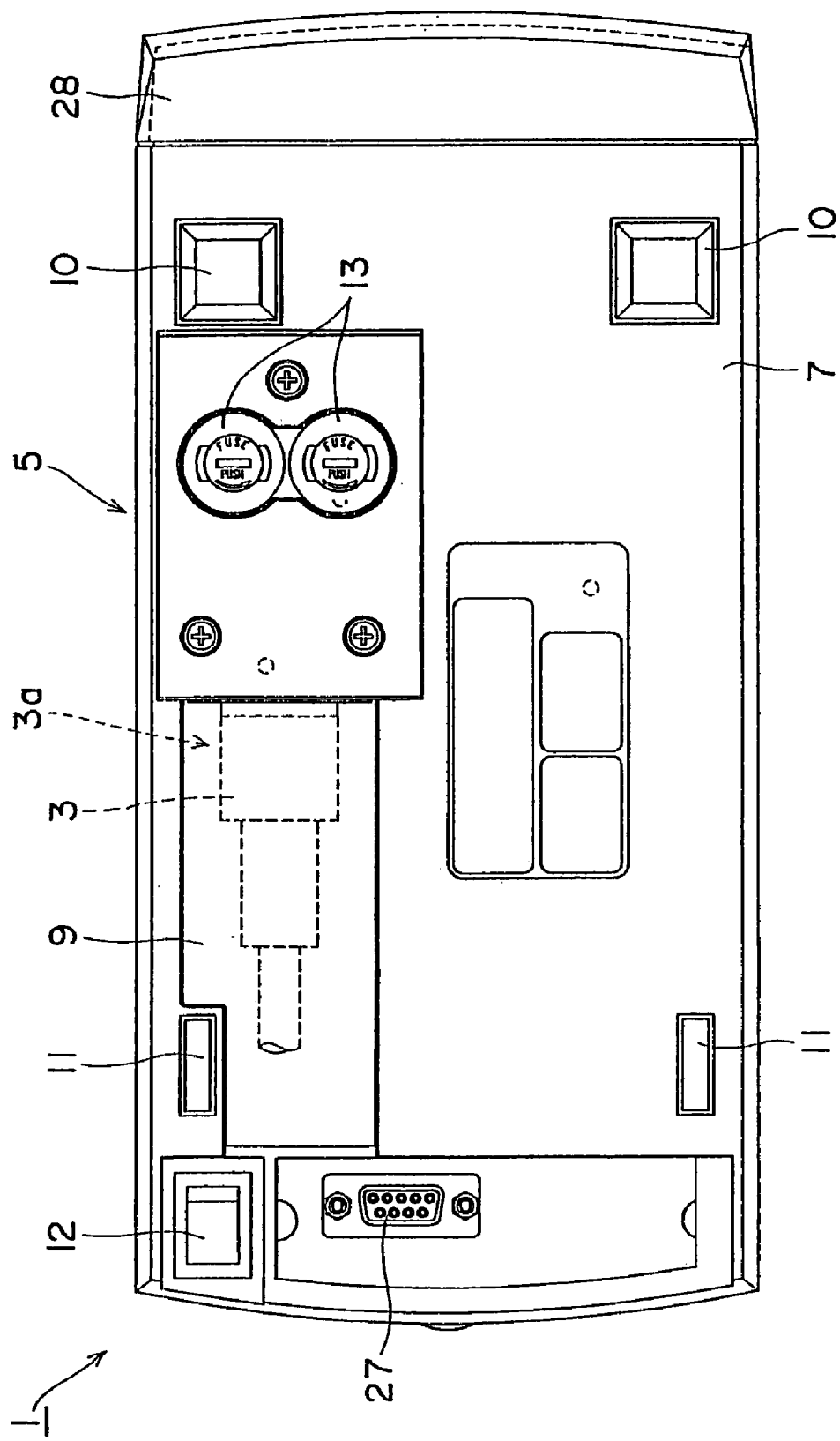
FIG. 3 is a bottom view showing a card reader.

The card reader part 6 is placed on the base plate 21 as shown in FIG. 2.

The recessed part 9 of the lower case 7 is formed in a width such that fingers holding the power cable 3 are not obstructed. Thereby, the operability of drawing/inserting of the power cable 3 can be secured.

Figure 5:
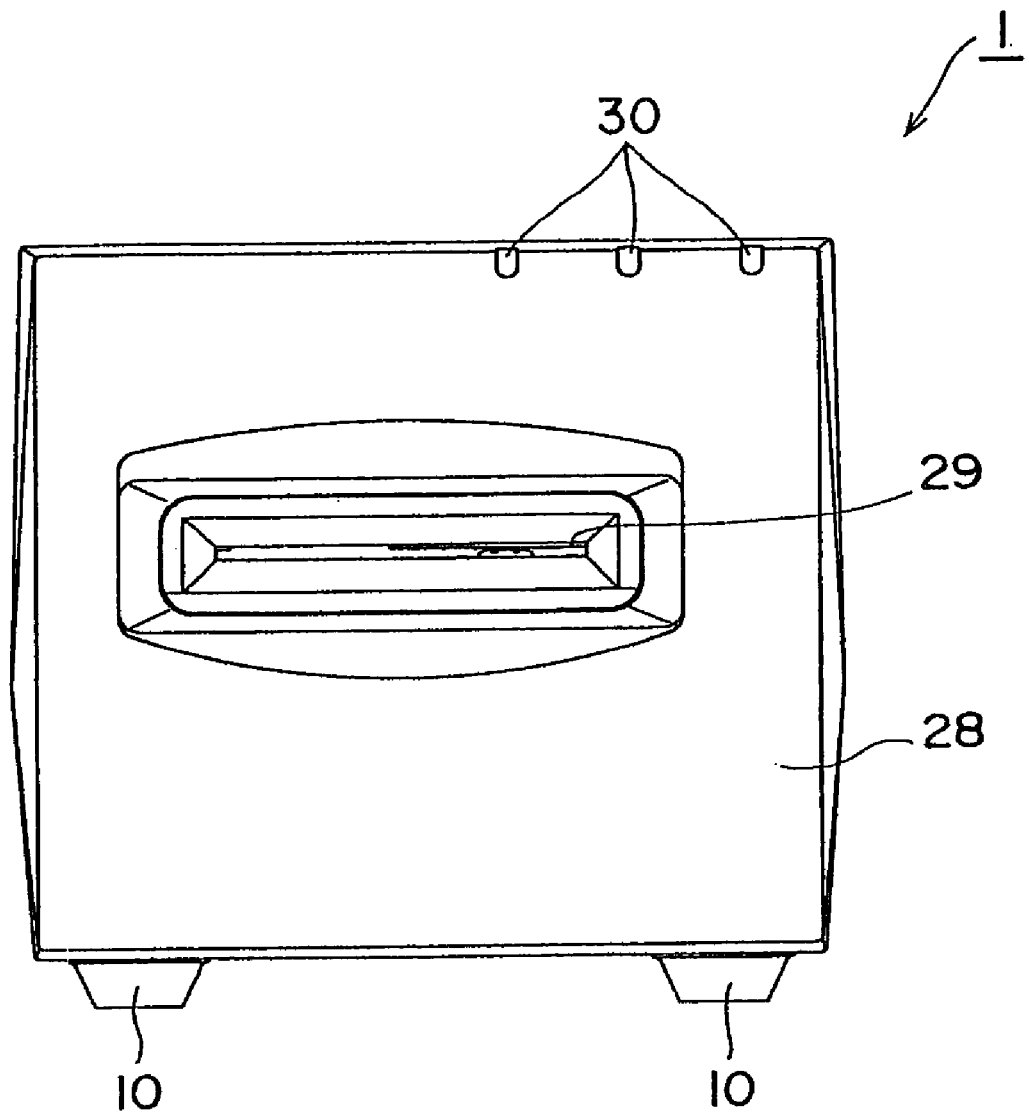
FIG. 5 is a front view showing a card reader.

A front cover 28 is provided at the front part of the card reader 1. A card inserting port 29 and LED display parts 30 are provided in the front cover 28 as shown in FIG. 5. The LED display parts 30 perform the display such as, for example, "Power", "Ready" and "Error".

Figure 4:
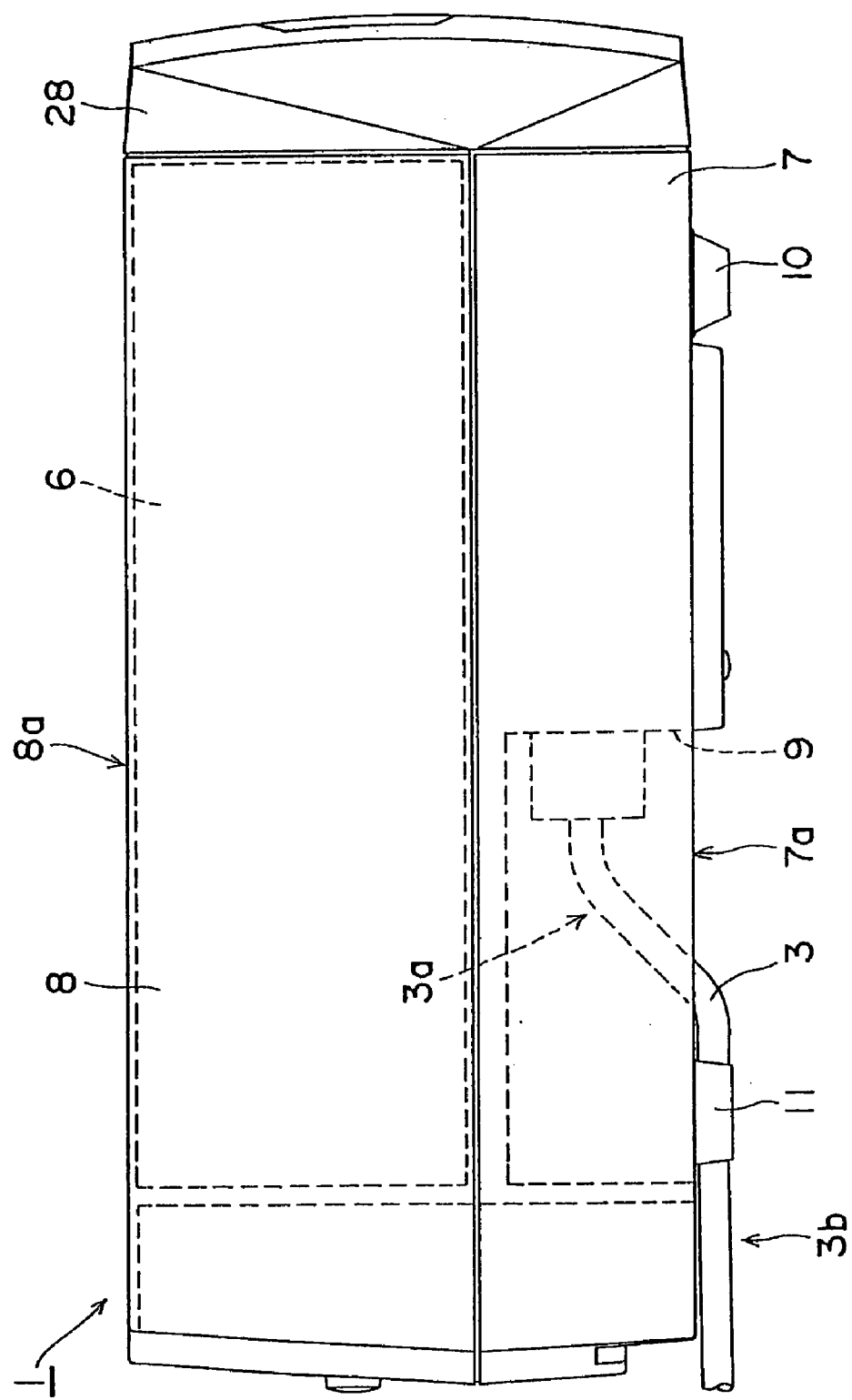
FIG. 4 is a side view showing a card reader.

The upper face 8a of the upper case 8 is formed to be a horizontal plane as shown in FIG. 4. As a result, for example, various terminal equipments for an identification card can be placed on the upper face 8a and thus space saving can be attained. Also, since the entire apparatus is formed in a case type like an approximately rectangular solid shape, the apparatus is easily packed.

When the above-mentioned card reader 1 is installed, the power cable 3 is inserted into the inlet part 4 through the recessed part 9. In this case, the width of the recessed part 9 is sufficiently ensured so that human fingers holding the power cable 3 can be put into the recessed part 9 to easily manipulate the power cable 3, and thus working can be performed with satisfactory operability.

The connected power cable 3 can be drawn out from the recessed part 9 to freely direct and turn toward the rear direction or the side direction. As a result, the degree of freedom for the installing place of the card reader 1 can be enhanced.

SECOND EMBODIMENT

Figure 6:
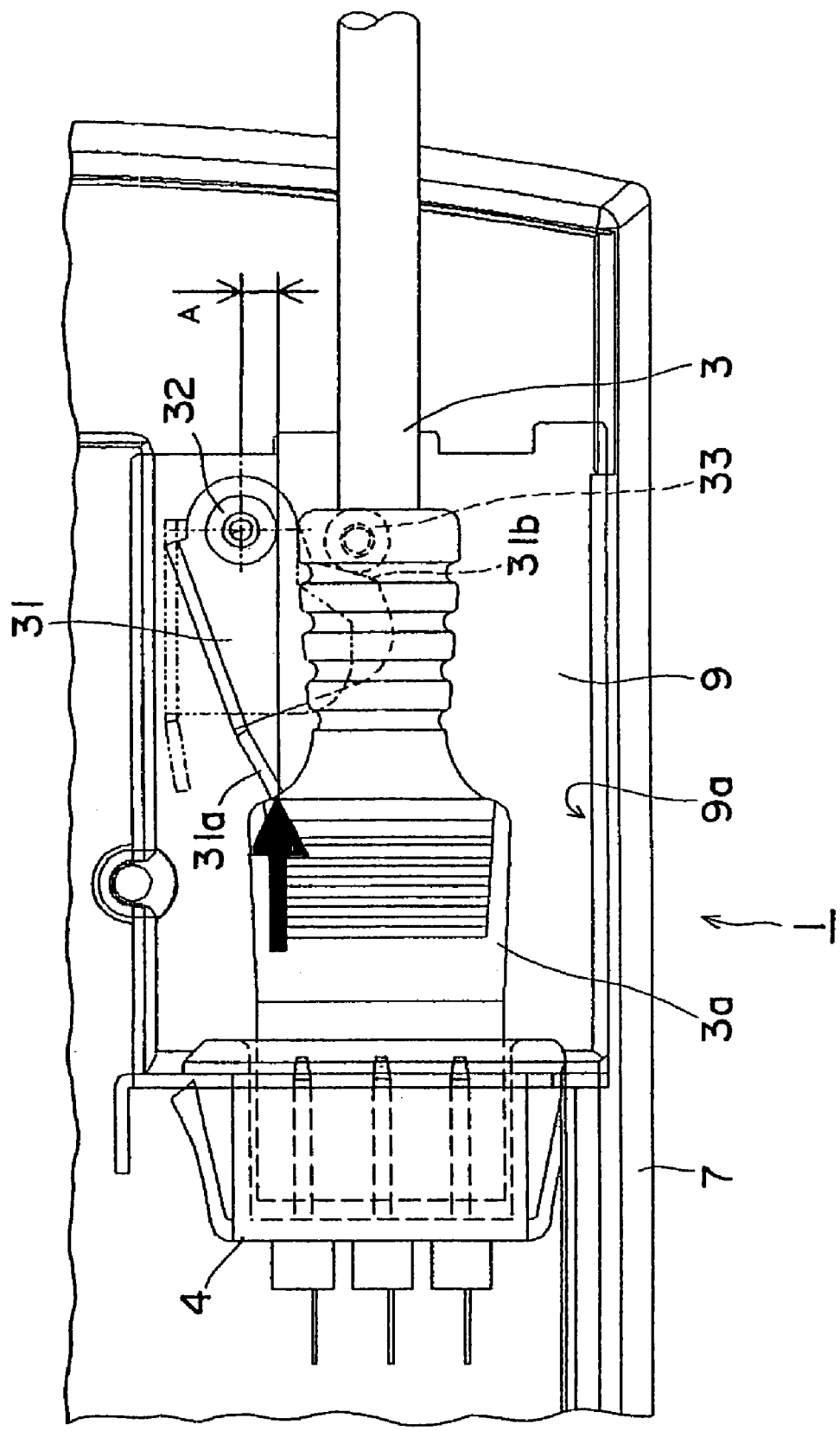
FIG. 6 is a bottom view showing a portion of another card reader, which shows the state in which an engaging part engages with a plug part inserted into an inlet part in accordance with another embodiment of the present invention.
Figure 7:
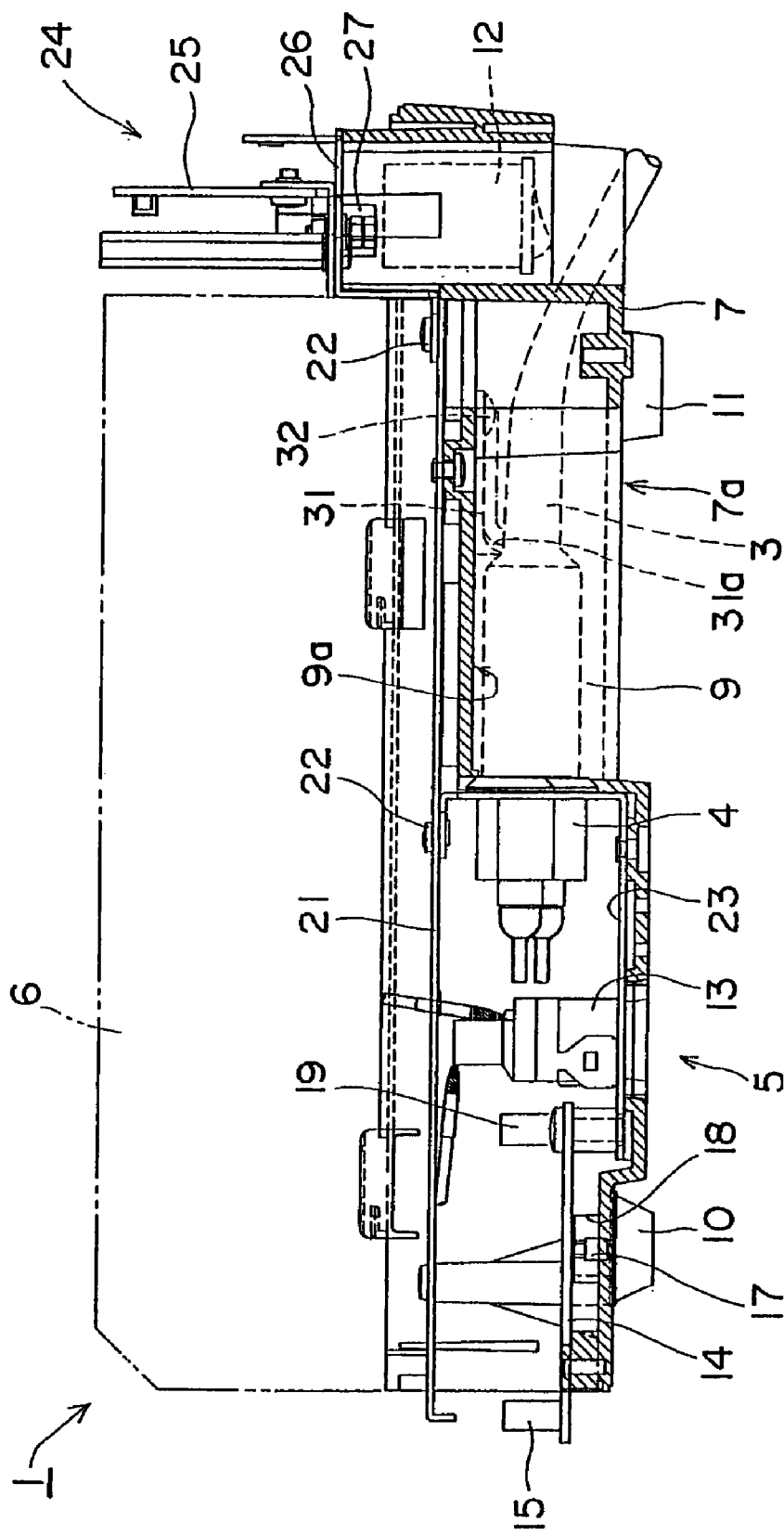
FIG. 7 is a longitudinal sectional side view showing the connecting portion of a card reader in which an upper case is removed and an engaging plate is arranged in the recessed part.
Figure 8:
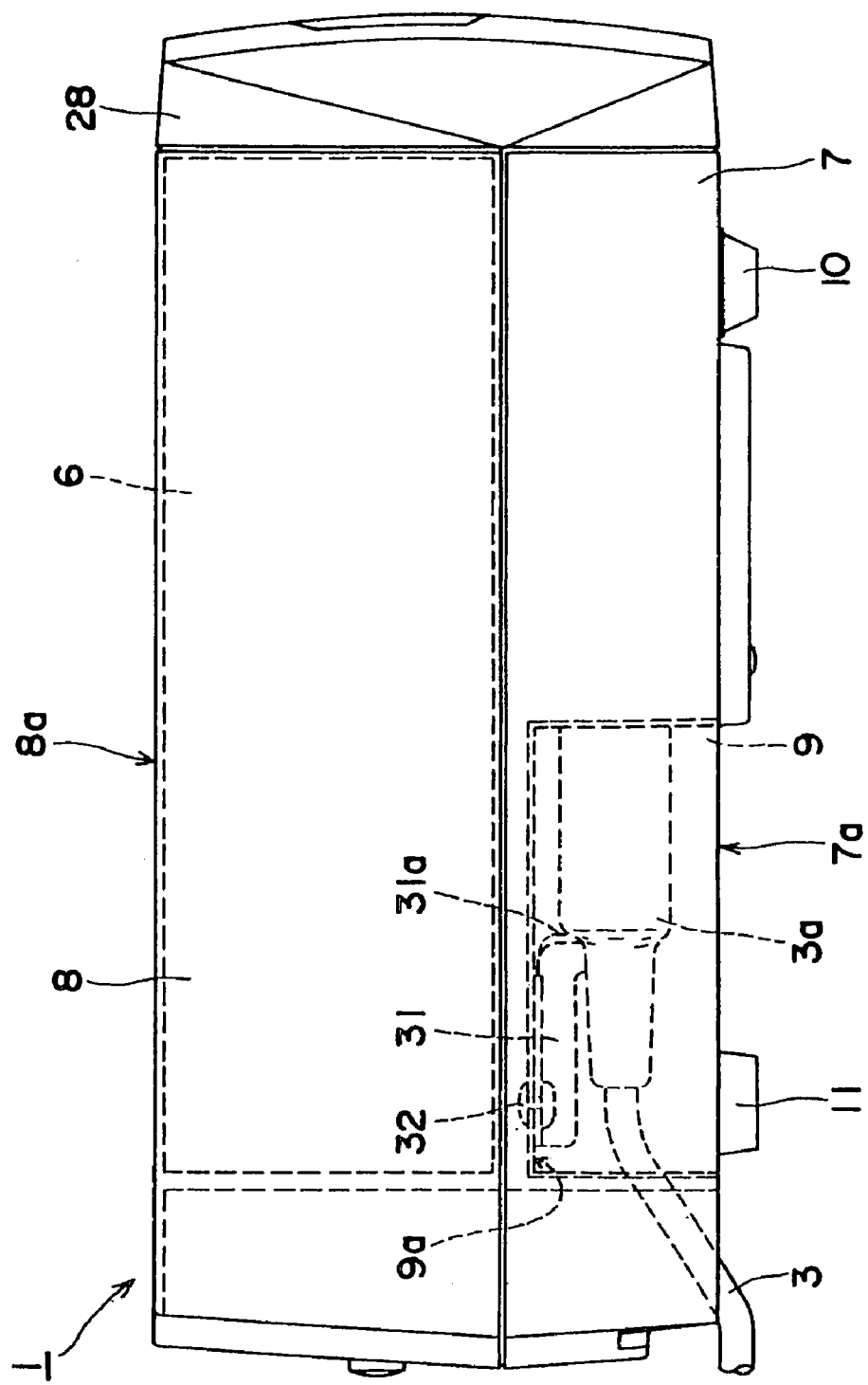
FIG. 8 is a side view showing a card reader in which the engaging plate is arranged in the recessed part in accordance with the embodiment of the present invention.

Next, a second embodiment of the present invention is shown in FIGS. 6 through 8. The same reference numerals are used for the same constitutional elements as those of the first embodiment.

The recessed part 9 is formed on the under surface 7a of the lower case 7 in a sufficient size such that the plug part 3a of the power cable 3 held by fingers is capable of inserting into the inlet part 4.

As shown in FIG. 6, an engaging plate 31 is turnably supported on an upper wall 9a of the recessed part 9 by caulking a rivet 32. An engaging part 31a is formed to be erected at a free end portion of the engaging plate 31 and an abutting part 31b is formed at other end portion of the engaging plate 31. The engaging plate 31 is turnable with the rivet 32 as a turning axis and an operator can turn the engaging plate 31 between a retreated position (two-dot chain line) and a locking position (solid line). The engaging plate 31 is disposed such that, when the engaging plate 31 is turned at the locking position, the engaging part 31a abuts with a comparatively hard portion, for example, the shoulder portion of the plug part 3a of the power cable 3, where the engaging part 31a is capable of abutting against in the drawing direction of the plug part 3a (see arrow in FIG. 6). In the present embodiment of the present invention, the engaging plate 31 is made of metal. However, plastic or other material may be used when a sufficient strength is provided to prevent the plug part 3a from drawing out.

A stopper 33 is fixed on the upper wall 9a of the recessed part 9. The stopper 33 abuts with the abutting part 31b of the engaging plate 31 to prevent the engaging plate 31 from turning further. The position where the engaging part 31a engages with the plug part 3a is set at the position that is shifted by the dimension "A" on the power cable 3 side with respect to the turning axis of the engaging plate 31 as shown in FIG. 6. Therefore, when the power cable 3 is pulled and a force is applied to the engaging part 31a, the engaging plate 31 is going to turn on the power cable 3 side, which results in biting further, and thus the disengagement of the plug 3a is prevented.

In the construction described above, the plug part 3a of the power cable 3 is inserted into the inlet part 4 at the recessed part 9 in the state that the engaging plate 31 in the card reader 1 is at the retreated position from the power cable 3.

Next, the engaging plate 31 is turned from the retreated position to the locking position by an operator to engage the engaging part 31a with the shoulder portion of the plug part 3a which is relatively hard. At the same time, the abutting part 31b substantially abuts with the stopper 33. Therefore, the plug part 3a is locked by the inlet part 4 and the engaging part 31a. The stopper 33 prevents useless turning of the engaging plate 31 when the power cable 3 is not inserted into the inlet part 4, or avoids the dispersion of the locked position of the power cable 3 by an operator. Furthermore, in the case that the stopper 33 is not provided, when the power cable 3 is forcibly pulled in the drawing-out direction, the force is only applied to the rivet 32 which is the rotation center of the engaging plate 31 and thus the engaging plate 31 may be damaged. Therefore, the stopper 33 serves to scatter the force in the drawing-out direction together with the rivet 32.

In the present embodiment of the present invention, the stopper 33 substantially abuts with the abutting part 31b at the locked position of the power cable 3. It is also possible that, the stopper 33 may not fully abut with the abutting part 31b. Also, it is possible that the stopper 33 may not be provided in the card reader 1. When the engaging plate 31 is turned from the locked position to the retreated position by an operator, the engaging part 31a is disengaged from the shoulder portion of the plug part 3a which is connected to the inlet part 4. After then, the plug part 3a can be drawn out from the inlet part 4 by hand.

As described above, in the card reader 1 according to the second embodiment of the present invention, the engaging plate 31 is turnable mounted on the upper wall 9a of the recessed part 9 by caulking the rivet 32. Therefore, the engaging plate 31 can be arranged in a small space of the recessed part 9 independent of its installing place longitudinally or laterally and the engaging part 31a can be turned with a finger. Accordingly, the plug part 3a of the power cable 3 is easily inserted into or drawn out from the inlet part 4 without using a tool or the like. Moreover, the engaging plate 31 may not be dropped or lost.

In the card reader 1 according to the second embodiment of the present invention, the position where the engaging part 31a engages with the plug part 3 a is set to be at the position that is shifted on the power cable 3 side with respect to the turning center of the engaging plate 31. Therefore, when the power cable 3 is pulled and a force is applied to the engaging part 31a, the engaging plate 31 is going to turn on the power cable 3 side, which results in biting further, and thus the disengagement of the plug 3a is prevented.

In the card reader 1 according to the second embodiment of the present invention, the near portion of the plug part 3a of the power cable 3 is also accommodated in the recessed part 9, and thus the disconnection at the near portion of the plug part 3a of the power cable 3 can be prevented.

THIRD EMBODIMENT

Figure 9:
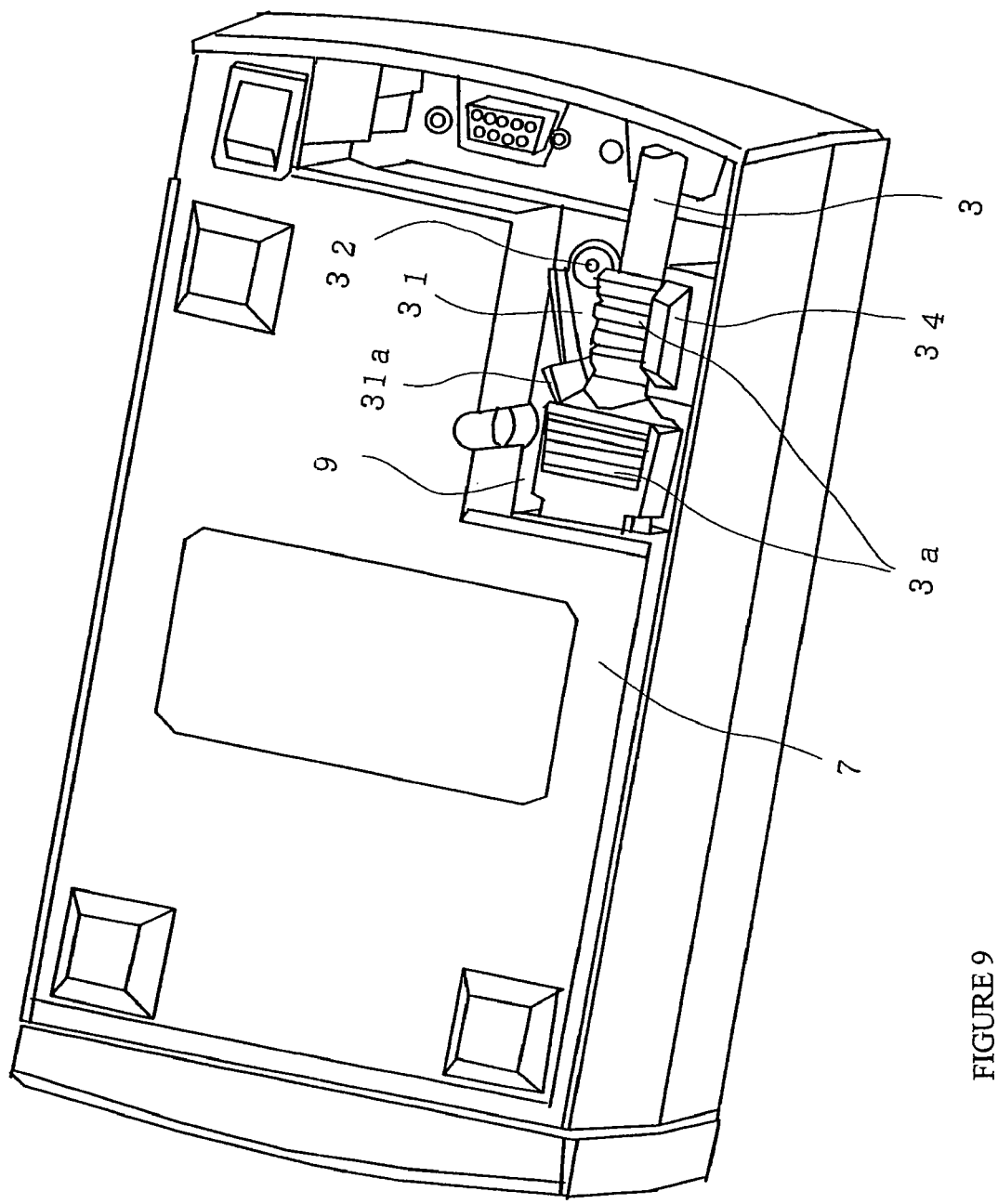
FIG. 9 is a bottom view of a card reader which shows a state in which a plug part inserted into an inlet part is engaged with the engaging part and a stopper for locking the plug part is further provided.

FIG. 9 shows a third embodiment of the present invention. The same reference numerals are used for the same constitutional elements as those of the second embodiment. The card reader in the third embodiment of the present invention is additionally provided with a stopper 34 for preventing the plug part 3a from moving in a side direction. The stopper 34 is located at a position facing to the engaging plate 31 across the plug part 3a on the recessed part 9 of the bottom face of the case 7. The recessed part 9 is provided for inserting the plug part 3a of the power cable 3. Therefore, when the engaging plate 31 is turned and abuts with the shoulder portion of the plug part 3a of the power cable 3 for locking, the plug part 3a of the power cable 3 is locked between the engaging plate 31 and the stopper 34 so as not to become loose in the side direction. The stopper 34 is constructed by using a block made of plastic, but it may be made of other material and may be formed in a simple plate shape.

The present invention is not limited to the embodiments described above, and many modifications can be made without departing from the subject matter of the present invention. For example, in the embodiments described above, the inlet part 4 is disposed so as to face backward (in the direction opposite to the card inserting port 29). However, the present invention is not limited to this embodiment. For example, the inlet part 4 may be disposed to face forward. In this case, it is preferable that the power switch 12 be disposed at the front part of the card reader and the fuse 13 and the lightning surge circuit board 14 be disposed on the rear side of the apparatus. Further, the arrangement in the right and left side direction of the power supply part 2 and the peripheral devices 5 in the drawings may be reversed as compared to the embodiment described above.

In the embodiments of the present invention, the lightning surge circuit board 14 is connected to the inlet bracket 23 so as to perform the frame ground (FG) connection and also the interface circuit board 25 is connected to the interface bracket 26 so as to perform the frame ground (FG) connection. However, the present invention is not limited to this specific embodiment. For example, each connection may be performed with a lead wire.

The second embodiment of the present invention describes the card reader 1 to which the power cable 3 is connected. However, the present invention is not limited to a card reader and may be applied to various electric apparatuses to which a power cable is connected.

Also, in the second embodiment of the present invention, the engaging part 31a locks the plug part 3a at one point. Alternatively, the engaging part 31a may be formed in a fork shape having two engaging portions to lock the plug part 3a at two points.

Further, in the second embodiment of the present invention, the engaging plate 31 is turnable held on the upper wall 9a of the recessed part 9. Alternatively, the engaging plate 31 may be turnable held on the sidewall of the recessed part 9 where drawing/inserting operation of the power cable 3 is not disturbed.

In the second embodiment of the present invention, the engaging plate 31 prevents the plug part 3a from moving in the drawing direction. In addition, the shape of the engaging plate 31 may be modified so as to further prevent from moving in an up-and-down direction of the plug part 3a. For example, a cover member parallel to the upper wall 9a of the recessed part 9 may be integrally formed with the engaging plate 31 to protrude such that the cover member overlaps on the power cable 3 when the engaging plate 31 is turned to the locking position. In this case, the cover member can hold the power cable 3 so as not to shake in a direction (up-and-down direction) perpendicular to the drawing/inserting direction of the power cable 3.

In the second embodiment of the present invention, the engaging plate 31 is turnable supported on the upper wall 9a of the recessed part 9. Alternatively, the engaging plate 31 may be constructed so as to slide in a direction perpendicular to the drawing/inserting direction of the power cable 3.

In the second embodiment of the present invention, the engaging plate 31 is provided on the recessed part 9 on one side of the power cable 3. However, the engaging plate 31 may be provided on both sides of the power cable 3 in order to increase the force preventing the drawing of the power cable 3 dependent on the weight of the apparatus.

In the second embodiment of the present invention, the engaging plate 31 is turnable held on the upper wall 9a of the recessed part 9 by caulking the rivet shaft 32. Alternatively, the engaging plate 31 is turnable held by caulking halfway the rivet shaft 32.

In the second embodiment of the present invention, the engaging plate 31 is turned by hand. Alternatively, a helical torsion spring or other means may be provided between the wall face of the recessed part 9 and the engaging plate 31 such that the engaging plate 31 automatically engages and locks the plug part 3a simultaneously with the connection of the plug part 3a of the power cable 3 to the inlet part 4.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:
    a power supply part for the card reader;
    at least one peripheral device including at least an inlet part for connecting a power cable to the power supply part from outside;
    a card reader part;
    a lower case for housing the power supply part and the peripheral device so that the peripheral device is disposed in a parallel manner in relation to the power supply part;
    an upper case for housing the card reader part;
    a recessed part structured for allowing the power cable to be inserted into the inlet part for connection;
    a shorting bar which is provided in the peripheral device;
    an operating hole of the lower case for allowing operation from outside; and
    a leg member which closes the operating hole.

2. The card reader according to claim 1, further comprising a base plate which separates the power supply part and the peripheral device from the card reader part, wherein the base plate mechanically supports and electrically connects the power supply part, the peripheral device, and the card reader part.

3. The card reader according to claim 1, wherein the inlet part and the recessed part for allowing the power cable to be inserted into the inlet part are arranged in a linear manner with respect to each other and are arranged parallel to the power supply part.

4. A card reader comprising:
    a power supply part for the card reader;
    at least one peripheral device including at least an inlet part for connecting a power cable to the power supply part from outside;
    a card reader part;
    a lower case for housing the power supply part and the peripheral device so that the peripheral device is disposed in a parallel manner in relation to the power supply part;
    an upper case for housing the card reader part;
    a recessed part structured for allowing the power cable to be inserted into the inlet part for connection; and
    an engaging member which is disposed on the recessed part and which is provided with an engaging part for engaging with the plug part of the power cable that is connected to the inlet part;
    wherein the engaging member is turnably mounted on the recessed part and the engaging part is a free end of the engaging member.

5. The card reader according to claim 4, wherein a position where the engaging part engages with the plug part is set to be on the power cable side with respect to a turning center of the engaging member.

6. The card reader according to claim 5, further comprising a stopper for regulating a turning range of the engaging member.

7. The card reader according to claim 4, further comprising a base plate which separates the power supply part and the peripheral device from the card reader part, wherein the base plate mechanically supports and electrically connects the power supply part, the peripheral device, and the card reader part.

8. The card reader according to claim 4, wherein the inlet part and the recessed part for allowing the power cable to be inserted into the inlet part are arranged in a linear manner with respect to each other and are arranged parallel to the power supply part.

9. A card reader comprising:
a power supply part for the card reader;
at least one peripheral device including at least an inlet part for connecting a power cable to the power supply part from outside;
a card reader part;
a lower case for housing the power supply part and the peripheral device so that the peripheral device is disposed in a parallel manner in relation to the power supply part;
an upper case for housing the card reader part;
a recessed part structured for allowing the power cable to be inserted into the inlet part for connection;
an engaging member which is disposed on the recessed part and which is provided with an engaging part for engaging with the plug part of the power cable that is connected to the inlet part; and
another stopper for preventing the power cable from moving on a side direction, wherein the another stopper is provided at a position so as to be opposed to the engaging member across the power cable on the recessed part for inserting the plug part of the power cable.

10. The card reader according to claim 9, further comprising a base plate which separates the power supply part and the peripheral device from the card reader part, wherein the base plate mechanically supports and electrically connects the power supply part, the peripheral device, and the card reader part.

11. The card reader according to claim 9, wherein the inlet part and the recessed part for allowing the power cable to be inserted into the inlet part are arranged in a linear manner with respect to each other and are arranged parallel to the power supply part.

12. A card reader comprising:
a power supply part for the card reader;
at least one peripheral device including at least an inlet part for connecting a power cable to the power supply part from outside comprising:
a power switch;
a fuse; and
a lightning surge circuit board;
a card reader part;
a lower case for housing the power supply part and the peripheral device so that the peripheral device is disposed in a parallel manner in relation to the power supply part;
an upper case for housing the card reader part; and
a recessed part structured for allowing the power cable to be inserted into the inlet part for connection.

13. The card reader according to claim 12, further comprising a base plate which separates the power supply part and the peripheral device from the card reader part, wherein the base plate mechanically supports and electrically connects the power supply part, the peripheral device, and the card reader part.

14. The card reader according to claim 12, wherein the inlet part and the recessed part for allowing the power cable to be inserted into the inlet part are arranged in a linear manner with respect to each other and are arranged parallel to the power supply part.

15. A card reader apparatus comprising:
a card reader part;
a case for holding the card reader part;
a power inlet port;
a recessed cavity located in the case containing the power inlet port and structured to allow a power plug part to be inserted into the power inlet port for connection without protruding the power plug part from the recessed cavity of the case of the card reader apparatus; and
the recessed cavity also being structured so that the power plug part connected to the power inlet port is capable of being connected to a flexible power cable whose direction in relation to the power plug part can be freely changed or moved.

16. The card reader apparatus of claim 15 further comprising:
an engaging member which is disposed on the recessed cavity and which is provided with an engaging part for engaging with the power plug part of the flexible power cable that is connected to the power inlet port in order to prevent accidental disengagement of the power plug part.

17. The card reader apparatus according to claim 16, further comprising a stopper for regulating a turning range of the engaging member.

18. The card reader apparatus according to claim 17, further comprising another stopper for preventing the power cable from moving in a side direction, wherein the another stopper is provided at a position so as to be opposed to the engaging member across the power cable on the recessed part for inserting the power plug part of the power cable.

19. The card reader apparatus of claim 15 wherein the at least one peripheral device comprises components disposed in a linear manner with respect to each other, and disposed parallel to a power supply part located in the case, so that the length of internal wiring cable from the power supply part can be shortened and the occurrence of noise can be suppressed.

20. The card reader apparatus according to claim 19, further comprising a base plate which separates the power supply part and the at least one peripheral device from the card reader part, wherein the base plate mechanically supports and electrically connects the power supply part, the peripheral device, and the card reader part.

21. The card reader apparatus according to claim 15, further comprising:
a shorting bar which is provided in the peripheral device;
an operating hole located in the case for allowing operation from outside; and a leg member which closes the operating hole.

* * * * *